(12) United States Patent
Takeuchi et al.

(10) Patent No.: US 11,219,865 B2
(45) Date of Patent: Jan. 11, 2022

(54) HOLLOW FIBER MEMBRANE MODULE

(71) Applicant: NOK CORPORATION, Tokyo (JP)

(72) Inventors: Yusuke Takeuchi, Kikugawa (JP); Tomotaka Mitsuhashi, Kikugawa (JP)

(73) Assignee: NOK CORPORATION, Tokyo (JP)

(*) Notice: Subject to any disclaimer, the term of this patent is extended or adjusted under 35 U.S.C. 154(b) by 129 days.

(21) Appl. No.: 16/604,419

(22) PCT Filed: Mar. 30, 2018

(86) PCT No.: PCT/JP2018/013567
§ 371 (c)(1),
(2) Date: Oct. 10, 2019

(87) PCT Pub. No.: WO2018/190147
PCT Pub. Date: Oct. 18, 2018

(65) Prior Publication Data
US 2021/0113967 A1  Apr. 22, 2021

(30) Foreign Application Priority Data

Apr. 11, 2017 (JP) .............................. JP2017-078304

(51) Int. Cl.
*B01D 63/04* (2006.01)
*B01D 53/22* (2006.01)
(Continued)

(52) U.S. Cl.
CPC .............. *B01D 63/04* (2013.01); *B01D 53/22* (2013.01); *B01D 53/268* (2013.01);
(Continued)

(58) Field of Classification Search
CPC .................. H01M 8/04149; H01M 2008/1095
See application file for complete search history.

(56) References Cited

U.S. PATENT DOCUMENTS 4,374,802 A * 2/1983 Fukasawa .............. B01D 63/02
422/48
2005/0241482 A1* 11/2005 Berger .................. B01D 53/268
96/8
(Continued)

FOREIGN PATENT DOCUMENTS

JP 2000-070682 A 3/2000
JP 2004-089800 A 3/2004
(Continued)

OTHER PUBLICATIONS

English language machine translation for JP 2005-34715. Retrieved from translationportal.epo.org on Apr. 14, 2021. (Year: 2021).*

*Primary Examiner* — Jason M Greene
(74) *Attorney, Agent, or Firm* — Harness, Dickey & Pierce, P.L.C.

(57) ABSTRACT

A hollow fiber membrane module that increases a ratio of a membrane area contributing to membrane separation effect. On an inner wall surface of a case 100, at least one flow-straightening projection 130 and at least one flow-disturbing projection 140 are provided. The flow-straightening projection 130 projects toward an outer circumferential surface of a hollow fiber membrane bundle 300 to secure a gap between the inner wall surface of the case 100 and the hollow fiber membrane bundle 300 and extends from one end side toward the other end side of the case 100 and straightens a flow of fluid. The flow-disturbing projection 140 extends along a circumferential direction of the case 100 and disturbs the flow of the fluid.

2 Claims, 8 Drawing Sheets

(51) Int. Cl.
*B01D 53/26* (2006.01)
*H01M 8/04119* (2016.01)
*H01M 8/1018* (2016.01)

(52) U.S. Cl.
CPC ... *H01M 8/04149* (2013.01); *B01D 2053/224* (2013.01); *B01D 2313/04* (2013.01); *B01D 2313/08* (2013.01); *H01M 2008/1095* (2013.01)

(56) References Cited

U.S. PATENT DOCUMENTS

| | | | |
|---|---|---|---|
| 2009/0152199 A1* | 6/2009 | Ma | B01D 63/02 210/640 |
| 2009/0242474 A1* | 10/2009 | Shirakawa | B01D 63/02 210/321.84 |
| 2010/0068603 A1* | 3/2010 | Kanazawa | H01M 8/04149 429/423 |

FOREIGN PATENT DOCUMENTS

| | | | | |
|---|---|---|---|---|
| JP | 2005-34715 | * | 2/2005 | B01D 63/02 |
| JP | 2005-034715 A | | 2/2005 | |
| JP | 2007-283292 A | | 11/2007 | |
| JP | 2009-136772 A | | 6/2009 | |
| JP | 2015-226859 A | | 12/2015 | |

* cited by examiner

PRIOR ART

Fig.8
PRIOR ART

HOLLOW FIBER MEMBRANE MODULE

CROSS-REFERENCE TO RELATED APPLICATIONS

This application is a National Stage of International Application No. PCT/JP2018/013567, filed Mar. 30, 2018 (now WO 2018/190147A1), which claims priority to Japanese Application No. 2017-078304, filed Apr. 11, 2017. The entire disclosures of each of the above applications are incorporated herein by reference.

FIELD

The present disclosure relates to a hollow fiber membrane module that can be used in a humidifying device and a dehumidifying device.

BACKGROUND

Figure 7:
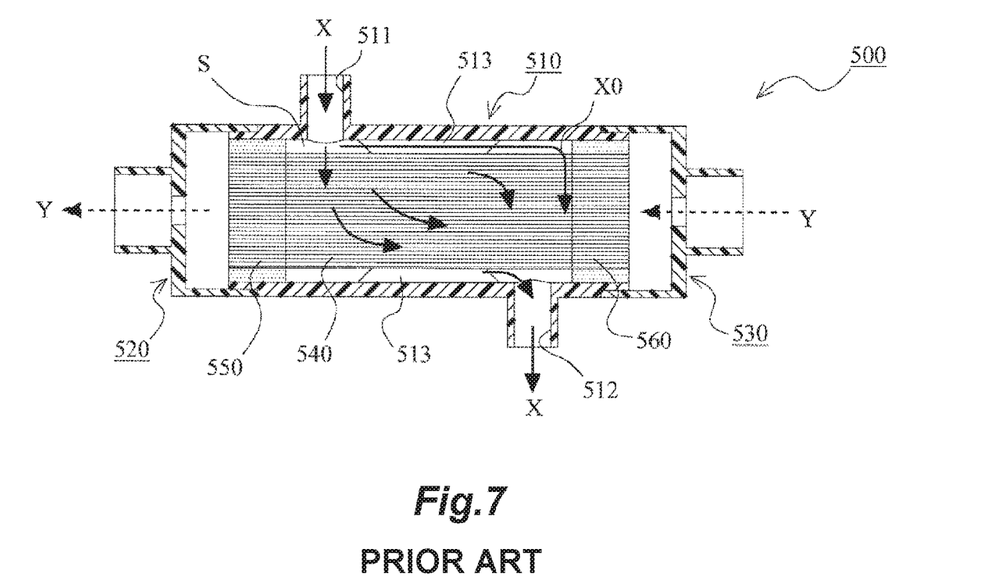
FIG. 7 illustrates a schematic sectional view of a conventional hollow fiber membrane module.
Figure 8:
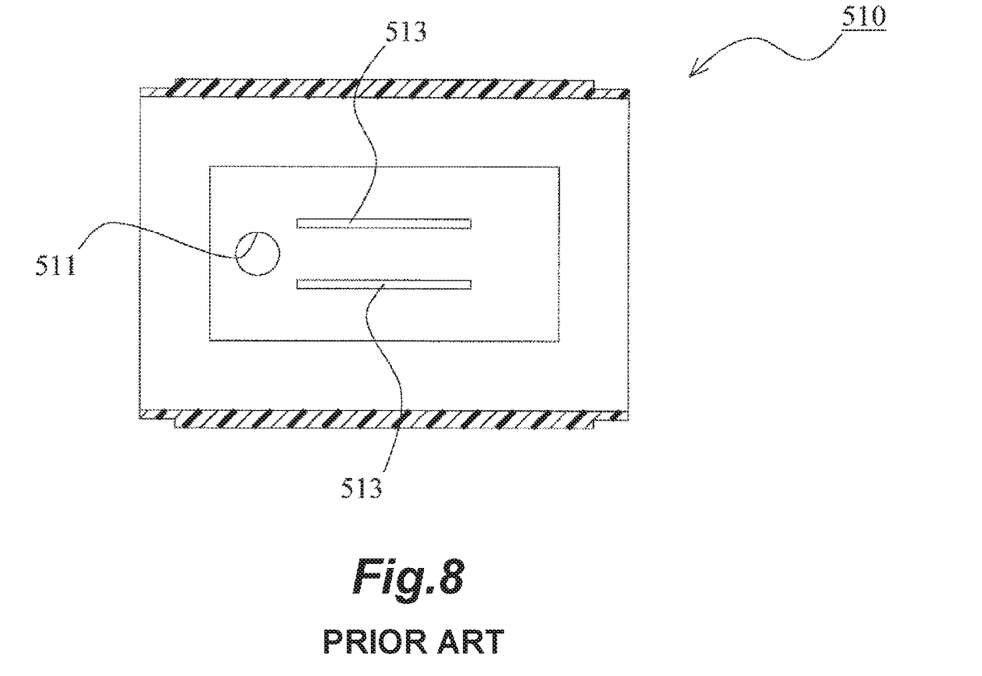
FIG. 8 illustrates a schematic sectional view of a conventional case.

In a solid polymer fuel cell, a humidifying device including a hollow fiber membrane is provided in order to humidify an electrolyte membrane. A conventional hollow fiber membrane module will be explained with reference to FIG. 7 and FIG. 8. FIG. 7 illustrates a schematic sectional view of a conventional hollow fiber membrane module. FIG. 8 illustrates a schematic sectional view of a case of the conventional hollow fiber membrane module. FIG. 8 illustrates the configuration of an inner wall surface of the case.

A hollow fiber membrane module 500 includes a tubular case 510. Heads 520 and 530 are respectively attached to both ends of the case 510. A hollow fiber membrane bundle 540 is housed in the case 510. Further, a pair of sealing and fixing sections 550 and 560 each sealing, on one end side and the other end side of the case 510, opening sections at both ends of the case 510 in a state in which the inside of hollows of hollow fiber membranes are opened and fixing the hollow fiber membrane bundle 540 to the case 510 is provided.

An intra-membrane channel that passes the inside of hollows of the hollow fiber membranes and an extra-membrane channel that passes outer wall surface sides of the hollow fiber membranes are formed in the hollow fiber membrane module 500. Specifically, the intra-membrane channel is a channel (indicated by an arrow Y) from the head 530 side to the head 520 side through the inside of hollows of the hollow fiber membranes in the hollow fiber membrane bundle 540. The extra-membrane channel is a channel (indicated by an arrow X) from an inlet 511 of the extra-membrane channel provided in the case 510 to an outlet 512 of the extra-membrane channel provided in the case 510 through the outer wall surface sides of the hollow fiber membranes in the hollow fiber membrane bundle 540.

The hollow fiber membrane module 500 with a hydrophilic material used as a material of the hollow fiber membranes can be used for a humidifying device. For example, moist air is allowed to flow in the arrow X direction through the extra-membrane channel and dry air is allowed to flow in the arrow Y direction through the intra-membrane channel. Then, moisture in the moist air is fed to the dry air by membrane separation effect of the hollow fiber membranes, to thereby humidify the dry air. Since the moisture is taken away from the moist air, the hollow fiber membrane module 500 may be used also as a dehumidifying device for drying the moist air.

In order to improve humidifying efficiency of the hollow fiber membrane module 500, it is important to increase a ratio of a membrane area contributing to the membrane separation effect with respect to a membrane area of the entire hollow fiber membranes to be housed in the case 510. When the outer circumferential surface of the hollow fiber membrane bundle 540 adheres to the entire inner wall surface of the case 510, a flow of fluid near the inlet 511 and near the outlet 512 tends to concentrate. To cope with this, the conventional hollow fiber membrane module 500 is provided with a flow-straightening projection 513 for straightening the flow of the fluid on the inner wall surface of the case 510. The flow-straightening projection 513 projects toward the outer circumferential surface of the hollow fiber membrane bundle 540 to secure a gap between the inner wall surface of the case 510 and the hollow fiber membrane bundle 540 and extends from one end side of the case 510 toward the other end side of the case 510. The flow-straightening projection 513 can prevent concentration of the flow of the fluid near the inlet 511 and near the outlet 512, to thereby increase the ratio of the membrane area contributing to the membrane separation effect.

However, in the conventional structure explained above, since a gap S is provided between the inner wall surface of the case 510 and the hollow fiber membrane bundle 540, the fluid (e.g., the moist air) entering from the inlet 511 tends to flow to the vicinity of the sealing and fixing section 560. Thus, a flow indicated by an arrow X0 in FIG. 7 tends to be a main flow and a flow rate of the fluid flowing in the bundle near the center of the hollow fiber membrane bundle 540 tends to decrease. Therefore, there is still room of improvement in order to increase the ratio of the membrane area contributing to the membrane separation effect.

CITATION LIST

Patent Literature

[PTL 1] Japanese Patent Application Laid-Open No. 2007-283292

[PTL 2] Japanese Patent Application Laid-Open No. 2015-226859

[PTL 3] Japanese Patent Application Laid-Open No. 2009-136772

SUMMARY

Technical Problem

An object of the present disclosure is to increase in a ratio of a membrane area contributing to membrane separation effect of a hollow fiber membrane module.

Solution to Problem

The present disclosure adopts a configuration explained below in order to solve the problem.

A hollow fiber membrane module including: a tubular case; a hollow fiber membrane bundle including a plurality of hollow fiber membranes to be housed in the case; and a pair of sealing and fixing sections each sealing, on one end side and another end side of the case, opening sections at both ends of the case in a state where the inside of hollows of the hollow fiber membranes are opened and fixing the hollow fiber membrane bundle to the case, an intra-membrane channel that passes the inside of hollows of the hollow fiber membranes and an extra-membrane channel that passes outer wall surface sides of the hollow fiber membranes being formed, the hollow fiber membrane module being configured to allow moist air to flow through one of the intra-membrane channel and the extra-membrane channel and dry air to flow through another, whereby moisture in the moist air is fed to the dry air by membrane separation effect of the hollow fiber membranes, wherein the case has an inlet of the extra-membrane channel provided at a position deviating to one end side of the case and an outlet of the extra-membrane channel provided at a position deviating to the other end side of the case and opposite to the inlet with respect to the hollow fiber membrane bundle, and the case has, on an inner wall surface thereof, at least one flow-straightening projection and at least one flow-disturbing projection, the flow-straightening projection projecting toward an outer circumferential surface of the hollow fiber membrane bundle to secure a gap between the inner wall surface of the case and the hollow fiber membrane bundle, extending from one end side toward the other end side of the case, and being configured to straighten a flow of fluid, and the flow-disturbing projection extending along a circumferential direction of the case and being configured to disturb the flow of the fluid.

The hollow fiber membrane module according to the present disclosure has the flow-straightening projection on the inner wall surface of the case. Thus, concentration of the flow of the fluid near the inlet and near the outlet can be prevented. In addition, since the flow-disturbing projection is provided on the inner wall surface of the case, a flow rate of the fluid flowing through the gap between the inner wall surface of the case and the hollow fiber membrane bundle can be reduced. This reduces the flow rate of the fluid that enters the inlet, and then flows from the gap to the vicinity of the sealing and fixing section on the outlet side, and then flows out from the outlet.

The case may have a member which is oval in cross-section perpendicular to a direction from one end side toward the other end side of the case, the member including a pair of substantially flat parts and a pair of curved parts that respectively connect both sides of the pair of substantially flat parts, the inlet may be provided in one of the pair of substantially flat parts and the outlet may be provided in another of the pair of substantially flat parts, and the flow-straightening projection and the flow-disturbing projection may be provided at least on an inner wall surface of the one of the pair of substantially flat parts where the inlet is provided.

This prevents concentration of the flow of the fluid near the inlet. While the fluid entering from the inlet flows in the gap between the inner wall surface of the case and the hollow fiber membrane bundle, the flow of the fluid can be disturbed by the flow-disturbing projection. Therefore, the fluid can enter the inside of the hollow fiber membrane bundle near the flow-disturbing projection.

Advantageous Effects of the Disclosure

According to the present disclosure, a ratio of a membrane area contributing to membrane separation effect can be increased.

DETAILED DESCRIPTION

A mode for carrying out the present disclosure will be illustratively explained in detail below on the basis of an example with reference to the drawings. However, dimensions, materials, shapes, relative disposition, and the like of components described in this example are not meant to limit the scope of the present disclosure to only those disclosed in examples unless specifically described otherwise. A hollow fiber membrane module according to the embodiment can be suitably used as a humidifying device for humidifying an electrolyte membrane in a solid polymer fuel cell. However, the hollow fiber membrane module can also be used as a dehumidifying device.

(Embodiment)

Figure 1:
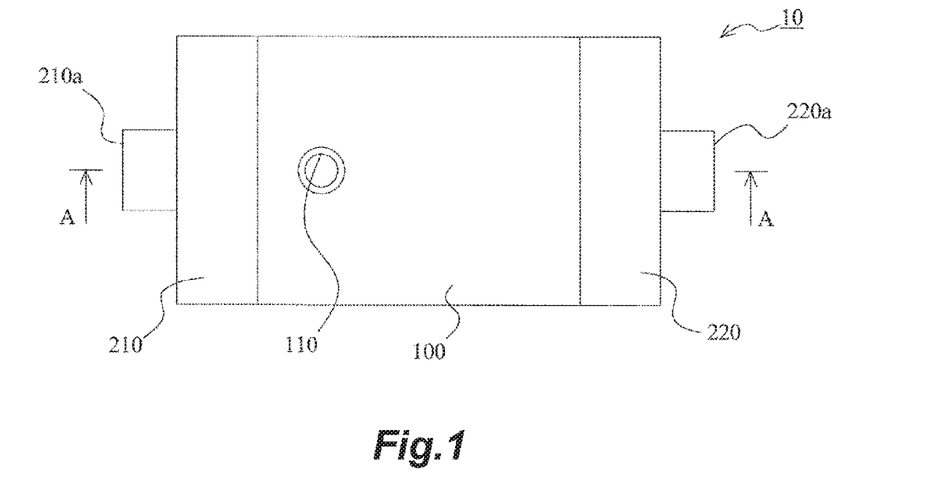
FIG. 1 illustrates a plan view of a hollow fiber membrane module according to an embodiment of the present disclosure.
Figure 2:
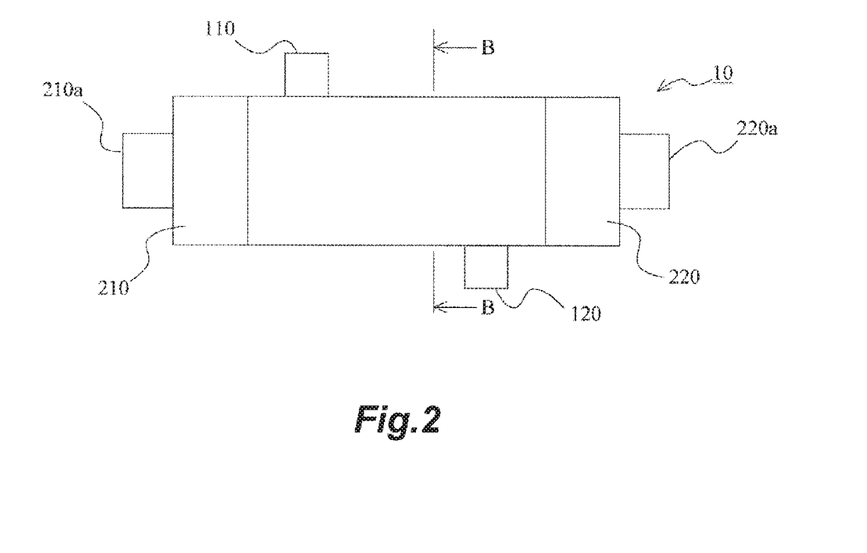
FIG. 2 illustrates a side view of the hollow fiber membrane module according to the embodiment of the present disclosure.
Figure 3:
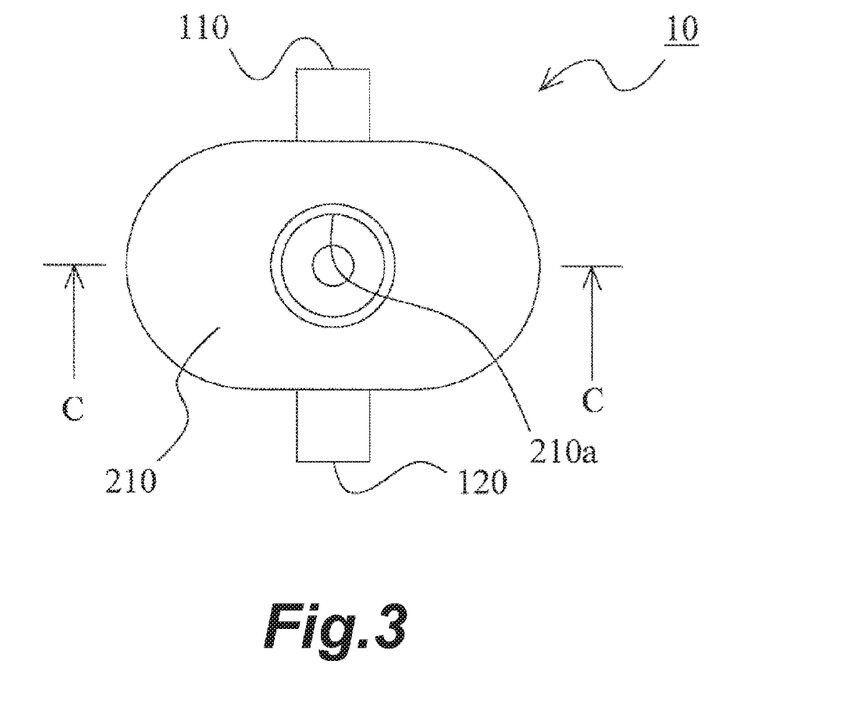
FIG. 3 illustrates a front view of the hollow fiber membrane module according to the embodiment of the present disclosure.
Figure 4:
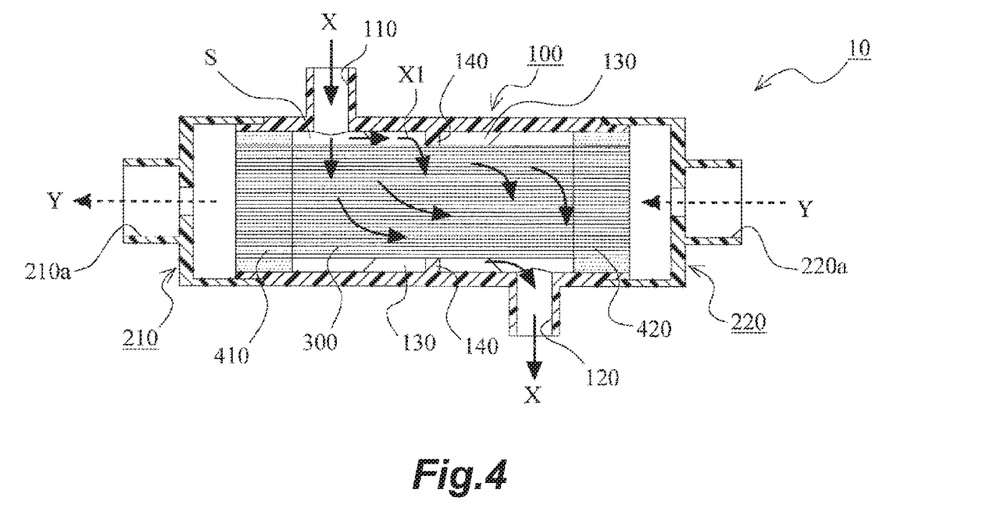
FIG. 4 illustrates a schematic sectional view of the hollow fiber membrane module according to the embodiment of the present disclosure.
Figure 5:
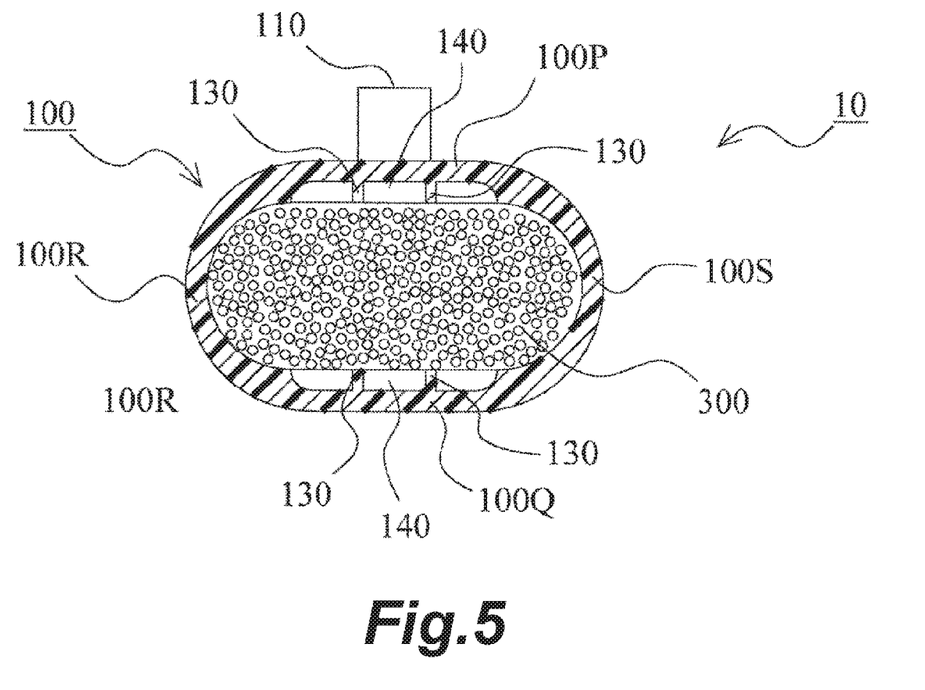
FIG. 5 illustrates a schematic sectional view of the hollow fiber membrane module according to the embodiment of the present disclosure.
Figure 6:
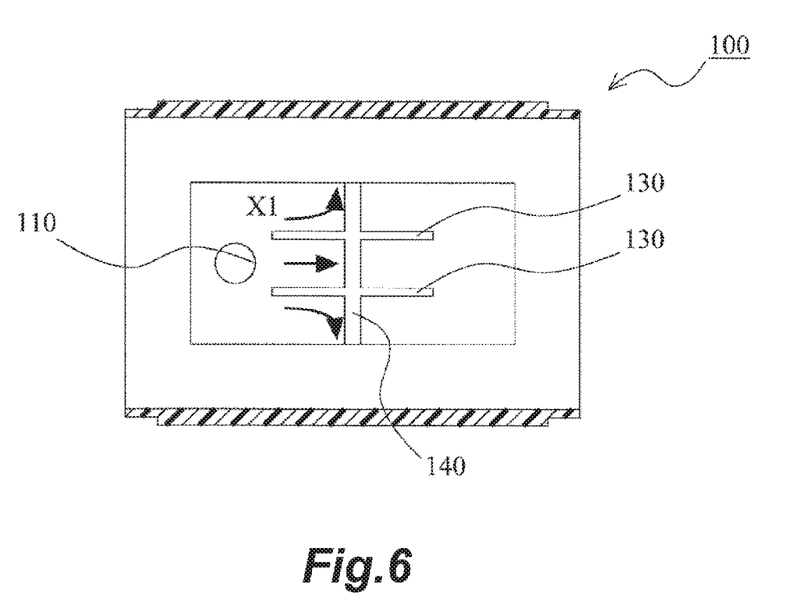
FIG. 6 illustrates a schematic sectional view of a case according to the embodiment of the present disclosure.

A hollow fiber membrane module according to an embodiment of the present disclosure is explained with reference to FIG. 1 to FIG. 6. FIG. 1 illustrates a plan view of the hollow fiber membrane module of the embodiment. FIG. 2 illustrates a side view of the hollow fiber membrane module of the embodiment. FIG. 3 illustrates a front view of the hollow fiber membrane module of the embodiment, which is viewed from the left side in FIG. 2. FIG. 4 illustrates a schematic sectional view of the hollow fiber membrane module of the embodiment, which is an AA sectional view in FIG. 1. FIG. 5 illustrates a schematic sectional view of the hollow fiber membrane module of the embodiment, which is a BB sectional view in FIG. 2. FIG. 6 illustrates a schematic sectional view of a case of the embodiment, which is a view showing only the case in a CC sectional view in FIG. 3.

<Hollow Fiber Membrane Module>

A hollow fiber membrane module 10 includes a tubular case 100, a pair of heads 210 and 220 respectively fixed to both end sides of the case 100, and a hollow fiber membrane bundle 300 and a pair of sealing and fixing sections 410 and 420 housed in the case 100. In the hollow fiber membrane module 10, an intra-membrane channel (indicated by an arrow Y in FIG. 4) that passes the inside of hollows of hollow fiber membranes in the hollow fiber membrane bundle 300 and an extra-membrane channel (indicated by an arrow X in FIG. 4) that passes outer wall surface sides of the hollow fiber membranes are formed.

The case 100 includes a pair of substantially flat parts 100P and 100Q and a pair of curved parts 100R and 100S that respectively connect both sides of the pair of substantially flat parts 100P and 100Q. The case 100 includes a member which is oval in cross-section perpendicular to a direction from one end side toward the other end side of the case 100 (see FIG. 5).

The case 100 has an inlet 110 to the extra-membrane channel at a position deviating to one end side of the case 100. The inlet 110 is provided in one substantially flat part 100P of the pair of substantially flat parts 100P and 100Q. The case 100 has an outlet 120 from the extra-membrane channel at a position deviating to the other end side and on the opposite side of the inlet 110 with respect to the hollow fiber membrane bundle 300. The outlet 120 is provided in the other substantially flat part 100Q of the pair of substantially flat parts 100P and 100Q. The pair of heads 210 and 220 are respectively fixed to both ends of the case 100. The pair of heads 210 and 220 each includes an annular member. An inner side of an inner circumferential surface 210a of the head 210 and an inner side of an inner circumferential surface 220a of the head 220 each serves as a passage for fluid. Specifically, the inner side of the inner circumferential surface 220a of the head 220 serves as an inlet of the intra-membrane channel and the inner side of the inner circumferential surface 210a of the head 210 serves as an outlet of the intra-membrane channel.

A plurality of (hundreds to tens of thousands) hollow fiber membranes are bundled together to form the hollow fiber membrane bundle 300. As a material of the hollow fiber membranes, a hydrophilic material is used. For example, Nafion with moisture permeability by solubility diffusion, PPSU (polyphenyl sulfone) with moisture permeability by a capillary condensation mechanism through pore size control, and the like are suitable. These materials with low elution property and high strength are suitable for a humidifying device and a dehumidifying device.

The pair of sealing and fixing sections 410 and 420 each seals, on one end side and the other end side of the case 100, opening sections at both ends of the case 100 in a state where the inside of hollows of the hollow fiber membranes are opened and fixes the hollow fiber membrane bundle 300 to the case 100. These sealing and fixing sections 410 and 420 are made by hardening a potting material such as an epoxy resin.

<Case>

Detailed explanation for the case 100 will be given. A flow-straightening projection 130 and a flow-disturbing projection 140 are provided on the inner wall surface of the case 100. The flow-straightening projection 130 projects toward the outer circumferential surface of the hollow fiber membrane bundle 300 to secure a gap between the inner wall surface of the case 100 and the hollow fiber membrane bundle 300. The flow-straightening projection 130 extends from one end side toward the other end side of the case 100. The flow-straightening projection 130 is configured to straighten a flow of fluid. Two flow-straightening projections 130 are provided on the inner wall surface of the substantially flat part 100P and two flow-straightening projections 130 are provided on the inner wall surface of the substantially flat part 100Q. The flow-disturbing projection 140 extends along the circumferential direction of the case 100. The flow-disturbing projection 140 is configured to disturb the flow of the fluid. One flow-disturbing projection 140 is provided on the inner wall surfaces of the substantially flat part 100P and one flow-disturbing projection 140 is provided on the inner wall surfaces of the substantially flat part 100Q. The flow-disturbing projection 140 is provided near the center of the both ends of the case 100.

The length of the flow-straightening projection 130 in the longitudinal direction (the horizontal direction in FIGS. 4 and 6) may be between ¼ and ¾, inclusive, of an effective length of the hollow fiber membranes, that is, the distance between opposed surfaces of the sealing and fixing sections 410 and 420. The height (a projection amount) of the flow-straightening projection 130 may be between 1/20 and ¼, inclusive, of the dimension of a cross section of the case 100, that is, the distance between opposed surfaces of the pair of substantially flat parts 100P and 100Q. The length of the flow-disturbing projection 140 in the circumferential direction may be between ⅛ and 1, inclusive, of the circumferential length of the inner circumferential surface of the case 100. The height (a projection amount) of the flow-disturbing projection 140 may be between 1/20 and ¼, inclusive, of the dimension of the cross section of the case 100, that is, the distance between the opposed surfaces of the pair of substantially flat parts 100P and 100Q. The flow-straightening projection 130 secures a gap S between the hollow fiber membrane bundle 300 and the substantially flat part 100P and between the hollow fiber membrane bundle 300 and the substantially flat part 100Q. In contrast, the hollow fiber membrane bundle 300 and the curved part 100R or 100S are in contact with each other, therefore a gap is not provided.

<Humidifying (Dehumidifying) Mechanism>

The humidifying (dehumidifying) mechanism in the hollow fiber membrane module 10 will be explained. The intra-membrane channel that passes the inside of hollows of the hollow fiber membranes and the extra-membrane channel that passes the outer wall surface sides of the hollow fiber membranes in the hollow fiber membrane bundle 300 are formed in the hollow fiber membrane module 10. The intra-membrane channel is a channel from the head 220 side to the head 210 side through the inside of hollows of the hollow fiber membranes in the hollow fiber membrane bundle 300 (indicated by the arrow Y in FIG. 4). The extra-membrane channel is a channel from the inlet 110 provided in the case 100 to the outlet 120 provided in the case 100 through the outer wall surface sides of the hollow fiber membranes in the hollow fiber membrane bundle 300 (indicated by the arrow X in FIG. 4).

The hollow fiber membrane module 10 allows moist air to flow in the extra-membrane channel and allows dry air to flow into the intra-membrane channel. Then, moisture in the moist air is fed to the dry air by membrane separation effect of the hollow fiber membranes, and the dry air is humidified. Since the moisture is taken away from the moist air, the moist air is dried. Therefore, the hollow fiber membrane module 10 can be used as a humidifying device or a dehumidifying device.

<Advantages of the Follow Fiber Membrane Module>

The flow-straightening projection 130 provided on the inner wall surface of the case 100 of the hollow fiber membrane module 10 prevents concentration of flow of the fluid near the inlet 110 and near the outlet 120. The flow-disturbing projection 140 provided on the inner wall surface of the case 100 reduces the flow rate of the fluid that flows in the gap S between the inner wall surface of the case 100 and the hollow fiber membrane bundle 300. This reduces the flow rate of the fluid that enters the inlet 110, flows from the gap S to near the sealing and fixing section 420 on the outlet 120 side, and flows out from the outlet 120.

In particular, in this example, an effect by the flow-straightening projection 130 and the flow-disturbing projection 140 provided on the inner wall surface of the substantially flat part 100P, in which the inlet 110 is provided, of the pair of substantially flat parts 100P and 100Q is great. That is, although the fluid entering from the inlet 110 tends to flow in the gap S formed between the inner wall surface of the substantially flat part 100P and the hollow fiber membrane bundle 300, a flow of the fluid flowing in the gap S is disturbed by the flow-disturbing projection 140. That is, as indicated by an arrow X1 in FIGS. 4 and 6, the fluid collides against the flow-disturbing projection 140, and a flowing direction of the fluid is changed such that the fluid flows toward the inner side or the circumferential direction of the hollow fiber membrane bundle 300. Thus, the fluid can enter the inside of the hollow fiber membrane bundle 300 near the flow-disturbing projection 140. The fluid also flows in the horizontal direction in FIG. 5 near the flow-disturbing projection 140. Thus, the fluid is also fed to near the inner circumferential surfaces of the curved parts 100R and 100S. Therefore the hollow fiber membrane module 10 can increase a ratio of a membrane area contributing to the membrane separation effect.

A comparison test result of the hollow fiber membrane module 10 and the conventional hollow fiber membrane module 500 will be explained. First, samples used in the test are explained. Dimensions of the cross section of the case 100 (dimensions of the inner wall surface of the case 100 in FIG. 5) of the sample of the hollow fiber membrane module 10 were 30 mm in height and 70 mm in lateral width and a curvature radius of the inner circumferential surfaces of the curved parts 100R and 100S was 15 mm. Dimensions of each of two flow-straightening projections 130 provided parallel to the hollow fiber membranes as shown in FIG. 6 were 30 mm in length and 3 mm in height. An interval between a pair of flow-straightening projections 130 was 15 mm. Dimensions of the flow-disturbing projection 140 provided perpendicular to the flow-straightening projection 130 in the center in the longitudinal direction of the flow-straightening projection 130 were 40 mm in length and 3 mm in height. The hollow fiber membrane bundle 300 was configured to have a bundle of one thousand hollow fiber membranes. An effective length of the hollow fiber membranes (equivalent to the distance between the opposed surfaces of the sealing and fixing sections 410 and 420) was 75 mm. Meanwhile, the sample of the conventional hollow fiber membrane module 500 is different from the sample of the hollow fiber membrane module 10 in that the flow-disturbing projection 140 is not provided.

Dry air was ventilated to the inter-membrane channel at 40 L/min as indicated by the arrow Y while ventilating moist air having a dew point of 71° C. to the extra-membrane channel at 40 L/min as indicated by the arrow X in FIGS. 4 and 7. As a result, in the case of the hollow fiber membrane module 10, the temperature of air after humidification discharged from the head 210 was 64.0° C. in terms of a dew point. Meanwhile, in the case of the conventional hollow fiber membrane module 500, the temperature of air after humidification discharged from the head 520 was 62.5° C. in terms of a dew point. The result of the comparison test reveals that humidification performance is improved by adopting the hollow fiber membrane module 10.

(Others)

Although the fluid flowing in the extra-membrane channel and the fluid flowing in the intra-membrane channel flow in the opposite directions in the embodiment, the fluid flowing in the extra-membrane channel and the fluid flowing in the intra-membrane channel may flow in the same direction. For example, the fluid in the intra-membrane channel may flow in the opposite direction of the arrow Y. Nevertheless, the fluid may flow in the opposite directions for improved humidification efficiency and dehumidification efficiency. Although the moist air flows in the extra-membrane channel and the dry air flows in the intra-membrane channel in the above embodiment, the dry air may flow in the extra-membrane channel and the moist air may flow in the intra-membrane channel.

REFERENCE SIGNS LIST

10 Hollow fiber membrane module
100 Case
100P, 100Q Substantially flat part
100R, 100S Curved section
110 Inlet
120 Outlet
130 Flow-straightening projection
140 Flow-disturbing projection
210, 220 Head
210a, 220a Inner circumferential surface
300 Hollow fiber membrane bundle
410, 420 Sealing and fixing section
S Gap

The invention claimed is:

1. A hollow fiber membrane module, comprising:
a tubular case;
a hollow fiber membrane bundle including a plurality of hollow fiber membranes to be housed in the case; and
a pair of sealing and fixing sections each sealing, on one end side and another end side of the case, opening sections at both ends of the case in a state where the inside of hollows of the hollow fiber membranes are opened and fixing the hollow fiber membrane bundle to the case,
an intra-membrane channel that passes the inside of hollows of the hollow fiber membranes and an extra-membrane channel that passes outer wall surface sides of the hollow fiber membranes being formed,
the hollow fiber membrane module being configured to allow moist air to flow through one of the intra-membrane channel and the extra-membrane channel and dry air to flow through another, whereby moisture in the moist air is fed to the dry air by membrane separation effect of the hollow fiber membranes, wherein
the case has an inlet of the extra-membrane channel provided at a position deviating to one end side of the case and an outlet of the extra-membrane channel provided at a position deviating to the other end side of the case and opposite to the inlet with respect to the hollow fiber membrane bundle, and
the case has, on an inner wall surface thereof, at least one flow straightening projection and at least one flow-disturbing projection,
the flow straightening projection projecting toward an outer circumferential surface of the hollow fiber membrane bundle to secure a gap between the inner wall surface of the case and the hollow fiber membrane bundle, extending from one end side toward the other end side of the case, and being configured to straighten a flow of fluid, and
the flow-disturbing projection extending along a circumferential direction of the case and intersecting the flow straightening projection to disturb the flow of the fluid.

2. The hollow fiber membrane module according to claim 1, wherein
the case has a member which is oval in cross-section perpendicular to a direction from one end side toward the other end side of the case, the member including a pair of substantially flat parts and a pair of curved parts that respectively connect both sides of the pair of substantially flat parts, the inlet is provided in one of the pair of substantially flat parts and the outlet is provided in the other of the pair of substantially flat parts, and the flow-straightening projection and the flow-disturbing projection are provided at least on an inner wall surface of the one of the pair of substantially flat parts where the inlet is provided.

* * * * *